United States Patent
Dent

[19]

[11] Patent Number: 5,842,115
[45] Date of Patent: Nov. 24, 1998

[54] TIME-DUPLEX WIRELESS TELEPHONE WITH IMPROVED HEARING-AID COMPATIBILITY

[75] Inventor: Paul W. Dent, Pittsboro, N.C.

[73] Assignee: Ericsson Inc., Research Triangle Park, N.C.

[21] Appl. No.: 591,061

[22] Filed: Jan. 25, 1996

[51] Int. Cl.$^6$ ..................................................... H04Q 7/32
[52] U.S. Cl. .............................. 455/73; 455/41; 455/66; 455/570
[58] Field of Search ............................. 455/550, 41, 425, 455/73, 95, 575, 570, 63, 296, 295, 501, 304, 117, 74, 572, 66; 379/52, 428, 406, 409, 410; 381/23.1

[56] References Cited

U.S. PATENT DOCUMENTS

| | | | |
|---|---|---|---|
| 2,989,705 | 6/1961 | Romano et al. | |
| 3,491,216 | 1/1970 | Picchiottino | 379/443 |
| 3,624,282 | 11/1971 | Salaman et al. | 379/443 |
| 3,674,922 | 7/1972 | Salaman et al. | 375/222 |
| 4,588,959 | 5/1986 | Herzog et al. | 330/149 |
| 4,596,899 | 6/1986 | Wojcik et al. | 379/52 |
| 5,172,410 | 12/1992 | Chace | 379/388 |
| 5,212,829 | 5/1993 | Brinkhaus | 455/296 |
| 5,247,704 | 9/1993 | Greenwood | 455/117 |
| 5,291,541 | 3/1994 | Gibler et al. | 379/52 |
| 5,557,673 | 9/1996 | Ginzburg | 379/52 |

FOREIGN PATENT DOCUMENTS

| | | | |
|---|---|---|---|
| 0405783A2 | 6/1990 | European Pat. Off. | H04M 1/72 |
| 9727682 | 1/1997 | WIPO | H04B 15/00 |

*Primary Examiner*—Wellington Chin
*Assistant Examiner*—Keith Ferguson
*Attorney, Agent, or Firm*—David G. Matthews

[57] ABSTRACT

A time-duplex wireless telephone for reducing magnetic coupling between the wireless telephone and a hearing aid to prevent hum pick-up in the hearing aid. The wireless telephone includes a battery, a radio circuit, and a humbucking coil. The radio circuit is connected to the battery and has a transmit mode where transmit signals are transmitted and a receive mode where received signals are received. The radio circuit intermittently is switched between the transmit mode and the receive mode. The radio circuit generates a transmission magnetic field when the radio circuit is transmitting transmit signals. A humbucking coil is connected in the radio circuit to generate a cancellation magnetic field that is directly proportional to the transmission magnetic field and in antiphase with the transmission magnetic field. The cancellation magnetic field at least partially cancels the transmission magnetic field and reduces magnetic coupling between the wireless telephone and a hearing aid used in conjunction with the wireless telephone.

29 Claims, 5 Drawing Sheets

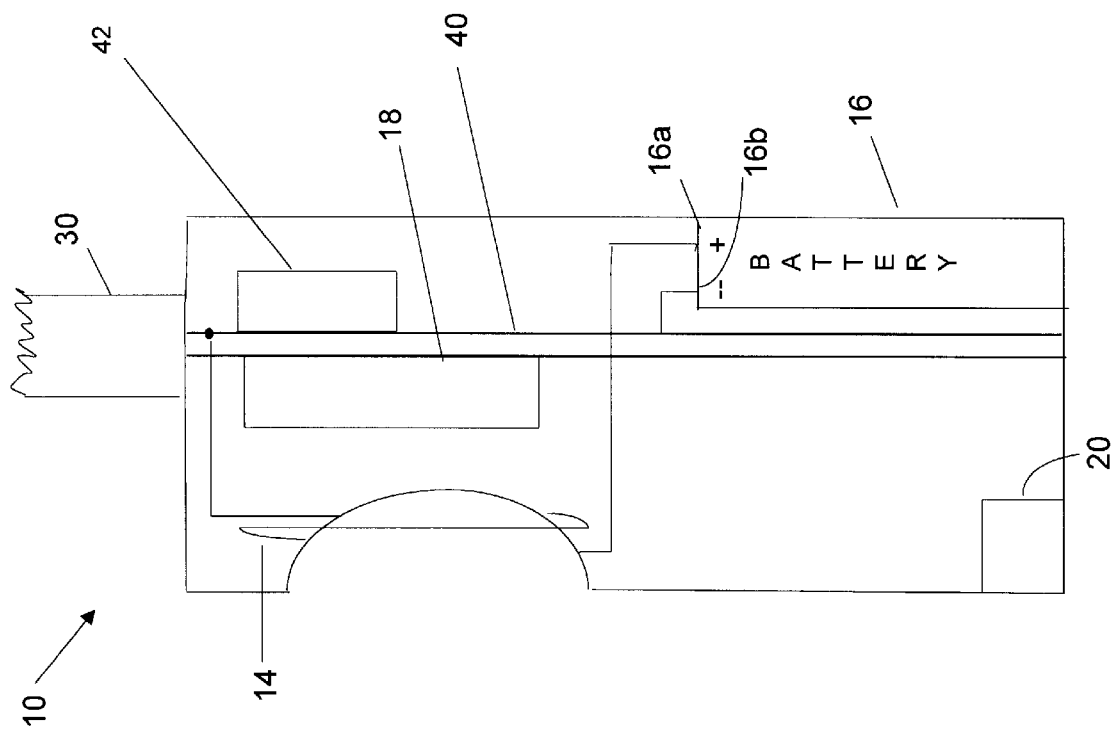

TIME-DUPLEX WIRELESS TELEPHONE WITH IMPROVED HEARING-AID COMPATIBILITY

FIELD OF THE INVENTION

The present invention relates generally to a time-duplex wireless telephone that reduces magnetic coupling between the wireless telephone and hearing aids.

BACKGROUND OF THE INVENTION

Time-duplex wireless telephones are used throughout the world and are employed in cellular systems such as the European GSM system, the U.S. IS54 system and the Japanese PDC system. Time-duplex wireless telephones are wireless telephones that intermittently transmit speech with a transmitter and receive speech with a receiver. The transmitter operates for a short time slot in a repetitive frame period to transmit speech to a base station alternating with the receiver operating in a different short time slot to receive speech from the base station. Time-duplex wireless telephones are advantageous in not requiring simultaneous transmission and reception, allowing costs to be reduced and giving longer battery life.

One problem with time-duplex wireless telephones is that the transmitter consumes higher current from the battery than the receiver. This causes the current drawn from the battery to be cyclic at the frame repetition rate. The cyclic current gives rise to an alternating transmission magnetic field that may cause magnetic coupling with certain types of hearing aids. The magnetic coupling that may occur between a wireless telephone and certain hearing aids may generate noise or hum in the hearing aid making use of the wireless telephone less than optimal.

A wireless telephone is needed that will reduce magnetic coupling and hum generated in certain hearing aids when a person with a hearing aid uses the wireless telephone. Unrelated art areas have addressed magnetic coupling and techniques for reducing magnetic coupling have been referred to as "humbucking". For example, in certain types of antique radio sets that operated from the AC supply hum at one or two times the supply frequency could originate in a number of ways.

One particular source of hum was use of a loudspeaker having an electromagnet instead of a permanent magnet. The electromagnet's coils served a dual purpose and also provided a smoothing inductance for the main supply rectifiers. In removing supply ripple from the supply, the speaker's electromagnet caused an AC field at the ripple frequency which induced a hum component into the speaker armature coil. To remove this, a known practice was to provide an auxiliary winding around the electromagnet's coil to obtain a sample of the ripple signal by transformer action. This was then added in antiphase in series with the speaker's armature coil to cancel hum. The extra winding was known as a "humbucking coil" and functioned to cancel an internal voltage fed to the speaker.

Another source of hum that was reduced by a technique known as "humbucking" occurred when directly heated filament tubes were connected to an AC filament supply. If one end of the filament was grounded and the other connected to an AC filament supply, then part of the filament, which was also the cathode, would have a line-frequency voltage relative to the control grid. This line frequency voltage caused anode current fluctuations at the line frequency and therefore hum in the speaker. One method to avoid that was to use a center-tapped filament transformer such that one end of the filament was energized with an antiphase line frequency component compared to the other. If the tube filament was symmetrically constructed, line frequency hum was thereby reduced. This arrangement was sometimes improved by using a variable potentiometer across the filament transformer winding to provide a variable center tap connection to ground. The tap position could then be adjusted to provide improved cancellation, not only of the filament-induced hum but also of other sources of line frequency hum. The process of adjusting the tap position was known as "bucking the hum."

More recently, adaptive humbucking has been provided on certain musical instrument amplifiers. Electric guitars are usually coupled by long leads to heavy high-power amplifiers to provide the artist with mobility. The long leads are a potential source of hum pick-up. In certain constructions, the amplifier may contain a means to inject a variable amount of line frequency or ripple or its harmonics in order to cancel the hum. This may be done when no music is being played by manually initiating the "humbucking" operation.

Another type of humbucking is a method for removing unwanted long-term repetitive components from an audio system that are related to a line frequency. A trigger clock is generated from line supply voltage zero crossings and synchronizes the sampling of the audio output into a digital signal processor (DSP) memory. The DSP accumulates like samples from one line period to the next in order to build a picture of the line-frequency-related interference waveform. Other, wanted signal components that would not in general correlate with the line frequency are averaged out of this process so only the interference waveform is obtained, which is then subtracted from the audio output. If the process successfully removes all repetitive components, the cancellation waveform ceases to accumulate and convergence has occurred.

SUMMARY

The wireless telephone of the present invention is designed for people with hearing aids. The wireless telephone includes a battery, a radio circuit, and a humbucking coil. The radio circuit is connected to the battery and has a transmit mode where transmit signals are transmitted and a receive mode where received signals are received. The radio circuit intermittently is switched between the transmit mode and the receive mode. The radio circuit generates a transmission magnetic field when the radio circuit is transmitting transmit signals. A humbucking coil is connected in the radio circuit to generate a cancellation magnetic field that is directly proportional to the transmission magnetic field and in antiphase with the transmission magnetic field. The cancellation magnetic field at least partially cancels the transmission magnetic field and reduces magnetic coupling between the wireless telephone and a hearing aid used in conjunction with the wireless telephone.

Accordingly, it is an object of the present invention to provide a time-duplex wireless telephone that reduces hum pickup in a hearing aid during use of the wireless telephone.

Another object of the present invention is to provide a humbucking coil for generating a cancellation magnetic field that is directly proportional to the magnetic field generated by the radio circuit of the wireless telephone during operation.

BRIEF DESCRIPTION OF THE DRAWINGS

FIG. 2 is a schematic side view of a wireless telephone of the preferred embodiment depicting the physical location of components in the wireless telephone.

DETAILED DESCRIPTION OF THE PREFERRED EMBODIMENTS

Figure 1:
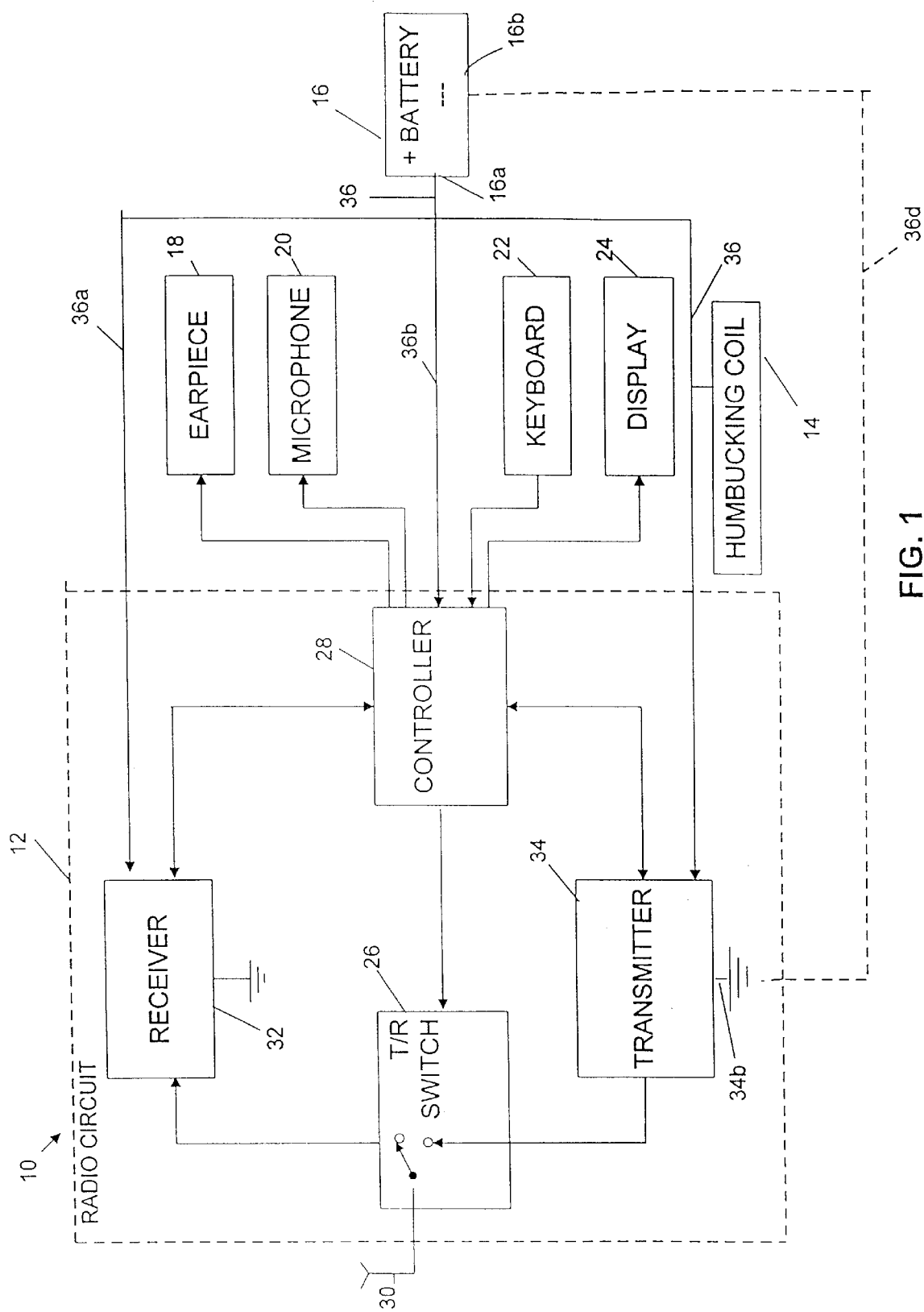
FIG. 1 is a simplified block diagram of a preferred embodiment wireless telephone.

Referring to the drawings, a time-duplex wireless telephone according to the present invention is shown and indicated by the numeral 10. In the preferred embodiment, wireless telephone 10 is telephone of the type which is operational in a TDMA cellular system such as the European GSM system, the U.S. IS54 system and the Japanese PDC system. The wireless telephone 10 is a time-duplex telephone that receives signals from a base station and transmits signals to the base station during different time slots in a conventional manner. The present invention is directed to a time-duplex wireless telephone 10 that has been adapted to reduce magnetic coupling between the wireless telephone 10 and a hearing aid or other electronic apparatus placed in a location proximate to the wireless telephone 10. The present invention is applicable to any time-duplex wireless telephone that transmits and receives at different times. Accordingly, the time-duplex wireless telephone 10 of the present invention can be employed in various time division multiple access (TDMA) and code division multiple access (CDMA) cellular systems.

As shown in FIG. 1, wireless telephone 10 generally includes a radio circuit 12, a humbucking coil 14, a power source or battery 16, and various telephone components such as an earpiece 18, microphone 20, keyboard 22 and display 24. Radio circuit 12 is a conventional radio circuit that provides for intermittent reception and transmission by operating a transmit/receive (T/R) switch 26 from a controller 28 that includes control circuitry. The T/R switch 26 alternatively connects an antenna 30 to receiver 32 to switch the wireless telephone 10 to a receive mode and to transmitter 34 to switch wireless telephone 10 to a transmit mode.

The total active circuitry in the radio circuit 12 is shown partitioned into a receiver 32 that operates intermittently, transmitter 34 that operates intermittently and more or less continuously active controller 28. The receiver 32, transmitter 34, and controller 28 include conventional receiver, transmitter, and control circuits, respectively. This partitioning shown in FIG. 1 is not meant to imply any particular physical partitioning but rather a functional partitioning. Nevertheless, it is usual that the transmitter circuits of transmitter 34, which consume the highest intermittent currents to be drawn from battery (16), are contained in a physically distinct component or Power Amplifier (PA) chip. The PA chip is usually connected directly to the battery 16 to avoid the voltage drop or losses associated with any switch or regulator circuit. The transmitter 34 is designed in a conventional manner to be disabled when T/R switch 26 is switched to connect the antenna 30 to the receiver circuitry 32. The transmitter 34 is disabled by removing a bias signal or the radio frequency drive signal, upon which it ceases to consume current although it remains connected to the battery 16.

The transmitter 34, receiver 32, and controller 28 are connected to the battery 16 by a supply path 36. The supply path 36 is formed by tracks within a printed circuit board that lead from the positive lead 16a of battery 16 to the radio circuitry 12. The battery current path 36 is schematically shown in FIG. 1 to include a receiver path 36a, controller path 36b, and a transmitter path 36c. Low currents flow through the receiver path 36a to receiver 32 and through the controller path 36b to the controller 28. These low currents do not typically induce magnetic field that could cause problematic coupling with hearing aids.

High currents do flow through the transmitter 34. The transmitter current from battery 16 flows to transmitter 34 in a loop formed by transmitter path 36c and a ground path 36d. Ground path 36d extends from the negative terminal 16b of battery 16 to the ground terminal 34b of transmitter 34.

The transmitter current flows in a loop during transmission creating a transmission magnetic field. The greater the area of the loop, the greater the magnetic field will be at a given distance from the wireless telephone 10. The actual, physical path taken by transmitter current flowing from the battery 16 to the transmitter 34 may be quite complicated and not usually designed to be of any particular form. Attempts can be made in design to minimize area of the current loop around the PC board through which transmitter current flows, but the large physical size of the battery may make the battery field then dominate.

Humbucking coil 14 in the preferred embodiment is connected in the transmitter path 36c to bypass a fraction of the transmitter current and generate a cancellation magnetic field. The humbucking coil 14 generates a cancellation magnetic field that is directly proportional to the transmitter current, and that is in antiphase with the transmission magnetic field. As discussed in more detail below, the humbucking coil 14 generates a cancellation magnetic field that at least partially cancels the transmission magnetic field to reduce coupling between the wireless telephone 10 and other electronic apparatuses such as hearing aids.

Referring to FIG. 2, wireless telephone 10 is schematically shown. A removable, rechargeable battery 16 is attached to the back side of the wireless telephone 10 and earpiece 18 is connected to the front side. Battery 16 and earpiece 18 are electrically connected to a printed circuit board 40. A transmitter power amplifier 42 (PA), which includes transmitter circuits of transmitter 34, lies at a top end of wireless telephone 10 in as close proximity to the antenna 30 as possible in order to minimize RF losses, and the battery terminals 16a and 16b lie at the bottom end. The transmitter current must therefore pass from one end of the wireless telephone 10 clear to the other end through a path which in the prior art was largely accidental in shape.

The humbucking path 14a connects the positive battery terminal 16a from a point near the battery terminal 16a on the PC board 40 to another point in the transmission path 36c on the PC board 40 near the transmitter power amplifier 42. The humbucking path 14a connects that humbucking coil 14 in the transmission path 36c so that a portion of the transmission current will flow through the humbucking coil 14 when the transmitter 34 is activated. The humbucking coil 14 is placed in the wireless telephone 10 in a location that will place the humbucking coil 14 generally adjacent a hearing aid when the wireless telephone 10 is held to a person's ear during use. In the preferred embodiment, the humbucking coil 14 encircles the earpiece 18 and is located in an upper front portion of the wireless telephone 10. This results in the humbucking coil generating a cancellation magnetic field in a location proximate the earpiece 18 where a hearing aid will be located when the wireless telephone 10 is held adjacent to a person's ear. Accordingly, the humbucking coil 14 provides for greatest coupling in the area where the hearing aid will be located during use of the wireless telephone 10.

The dimensions, sense, orientation and number of turns of the humbucking coil 14 must of course be determined by experimentation using a particular wireless telephone 10 design in order to generate a cancellation magnetic field that effectively cancels the transmission magnetic field. The humbucking coil 14 is not necessarily oriented or placed exactly as drawn in FIG. 2, which is meant only to be illustrative of the principle of locating the humbucking coil 14 such that it will be generally adjacent the hearing aid during use of the wireless telephone 10.

Figure 3A:
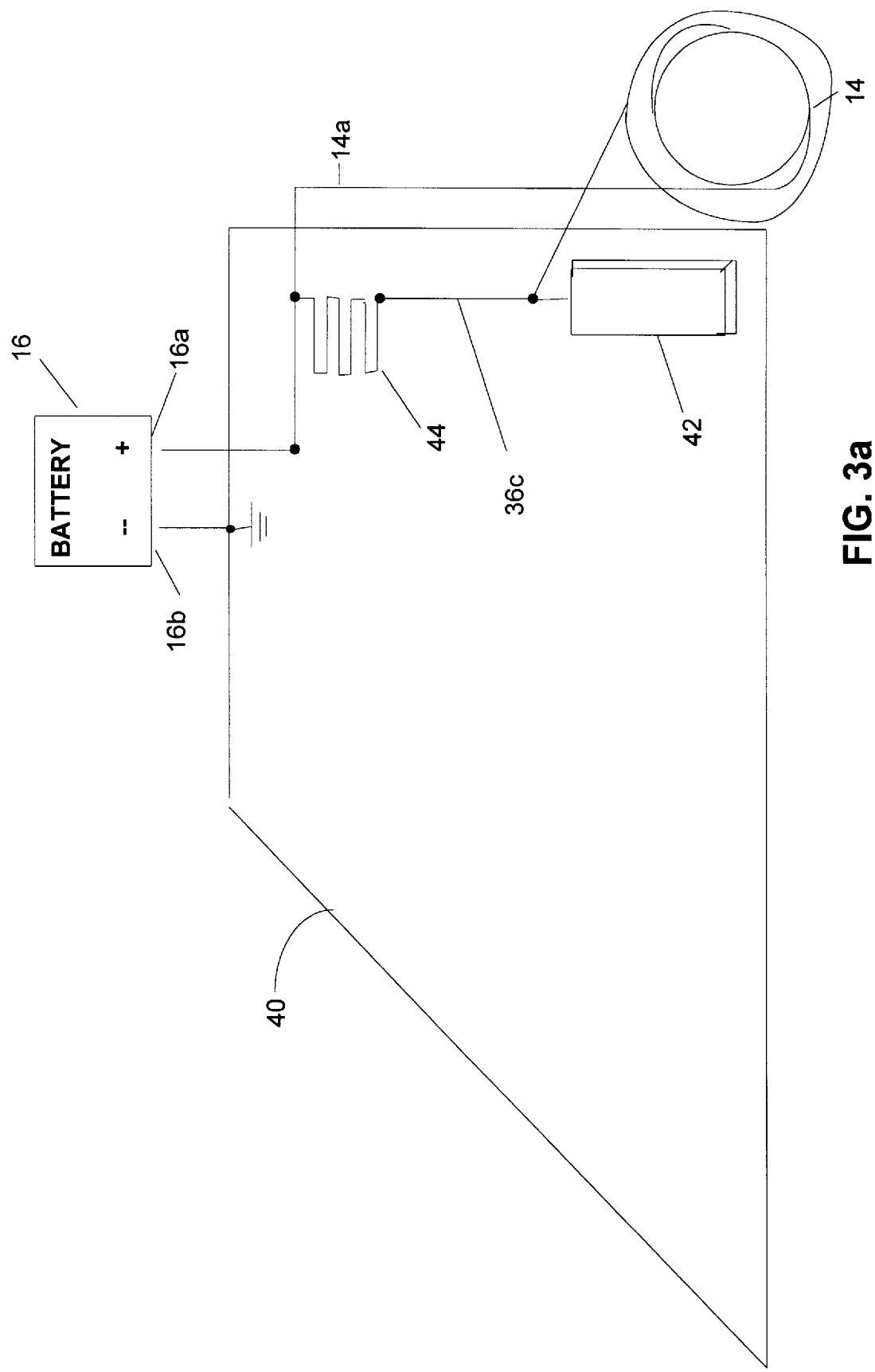
FIG. 3a is a electrical schematic showing the humbucking coil connected between the power amplifier and battery according to the preferred embodiment.
Figure 3B:
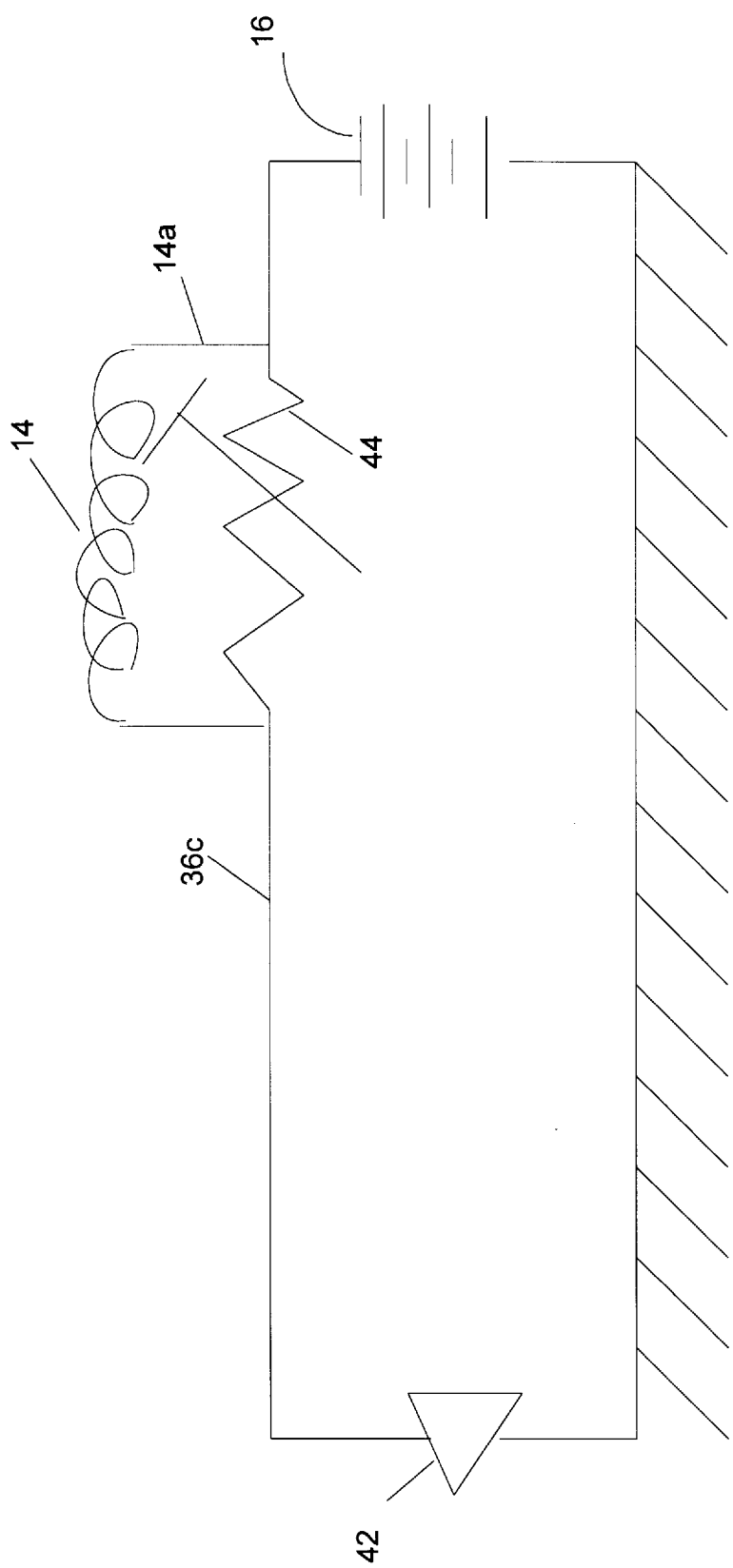
FIG. 3b is an equivalent electrical schematic showing the humbucking coil connected between the battery and power amplifier according to the preferred embodiment.

FIG. 3*a* and 3*b* show schematic representations of the transmission path 36*c* connecting the battery 16 to the power amplifier (PA) 42. The transmission path 36*c* for current flow between battery 16 and power amplifier 42 is optionally extended by inclusion of a little extra, deliberate tract length or humbucking resistor 44 on the printed circuit board 40. The humbucking resistor 44 allows a selected small voltage drop to occur, allowing a proportion of the transmission current to flow through the humbucking coil 14 which is connected in parallel to the transmission path 36*c*, as shown in the equivalent electrical circuit of FIG. 3*b*. The extra track length forming the humbucking resistor 44 can optionally comprise a meander line with breakable links to provide a means of adjusting the amount of transmission current that is bypassed through the humbucking coil 14.

Bypassing only a fraction of the transmission current is not meant to imply a limitation of the invention to this mode. Indeed, the humbucking coil 14 may bypass a fraction of the entire battery current consumed by all circuits. To bypass a fraction of the entire battery current, the humbucking resistor 44 is positioned in the battery path to receive the entire battery current and the humbucking coil is connected in parallel with the humbucking resistor 44.

Moreover, the inventive introduction of a humbucking coil 14 to reduce radiated magnetic hum fields is not restricted to a passive implementation as shown in FIG. 2 and FIGS. 3*a* and 3*b*. As an alternative, humbucking coil 14 could be provided that would only require a small current drive to produce a cancelling field. The low-current drive could be provided by a transistor switch activated by the transmit enable signal to the T/R switch, for example. In the case of a PIN diode switch, the diode current itself could flow through the humbucking coil thus obtaining dual use of the same current for efficiency. Such a low current is more convenient to adjust in the case that adjustment is necessary, but also creates the need to adjust it in proportion to the current consumption of power amplifier 42 in order to achieve cancellation. This could be achieved by use of a D-to-A converter to convert digitally prestored current values to currents in relation to the transmit power level selected, or could be user-adjusted by means of the display 24 and keyboard 22 for best operation.

Figure 4:
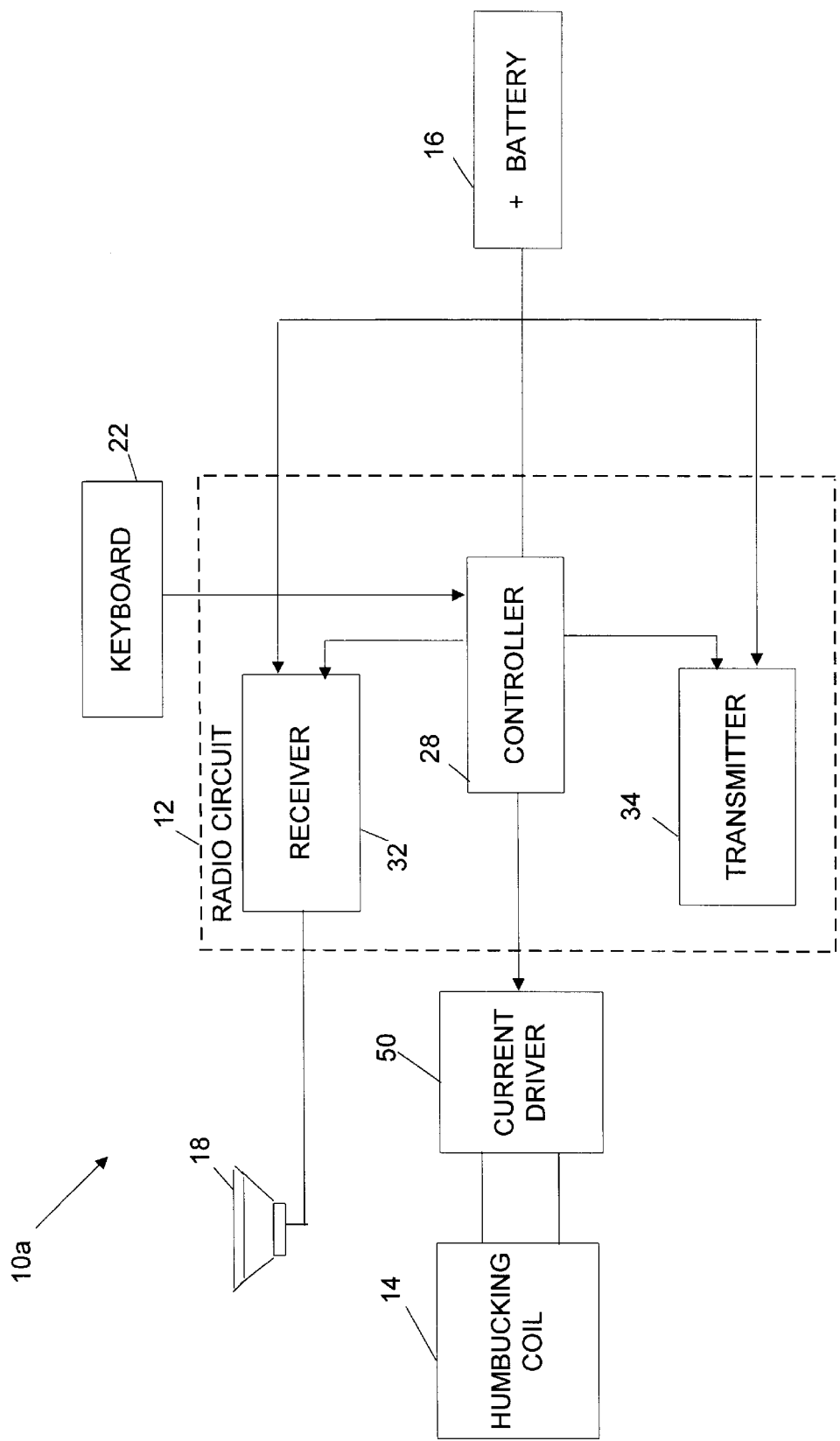
FIG. 4 is a simplified block diagram of an alternate embodiment wireless telephone.

Turning to FIG. 4, a wireless telephone 10*a* according to an alternative embodiment is shown. Wireless telephone 10*a* includes the components of the wireless telephone 10 shown in FIGS. 1,2,3*a* & 3*b*. In wireless telephone 10*a*, however, the humbucking coil 14 is connected to a current drive 50 which passes current through the humbucking coil 14 for generating the cancellation magnetic field. The current drive 50 is adjustable to control the current passing through the humbucking coil 14 and the corresponding cancellation magnetic field generated. The current drive is preferably a D-to-A converter. The D-to-A converter includes prestored current values and generates a selected current to be passed through the humbucking coil 14 based on the prestored current value selected.

Controller 28 activates and selects a prestored current value in the current drive 50 by outputting a control signal to the current drive 50. The control signal activates the current drive 50 when the transmitter 34 is transmitting by using, for example, the transmit enable signal. In one embodiment, the control signal also represents a prestored current value that corresponds to the current consumption of the transmitter 34. The control current, accordingly, causes the current drive 50 to be adjusted in proportion to the current consumption of the transmitter 34. In another embodiment, the prestored current value outputted to the current drive 50 can be user-selected using the keyboard 22, allowing a user of wireless telephone 10*a* to manually adjust the cancellation magnetic field.

It will be appreciated by those of ordinary skill in the art that the present invention can be embodied in other specific forms without departing from the spirit of essential character thereof. The presently disclosed embodiments are therefore considered in all respects to be illustrative and not restrictive.

What is claimed is:

1. A wireless telephone comprising:
   a) a power source;
   b) transmitter means connected to the power source for intermittently transmitting transmit signals, wherein a transmission magnetic field is generated during transmission of said transmit signals;
   c) receiver means connected to the power source for intermittently receiving receive signals at times different from when said transmitter means transmits transmit signals;
   d) a supply path for passing supply current from said power supply to said transmitter means and said receiver means;
   e) humbucking means including a humbucking coil for passing current directly proportional to the supply current through said humbucking coil during transmission of said transmit signals to generate a cancellation magnetic field directly proportional to said transmission magnetic field when said transmitter means is transmitting transmit signals so as to at least partially cancel said transmission magnetic field and reduce magnetic coupling between said wireless telephone and proximate electronic apparatuses.

2. The wireless telephone of claim 1, further including an earpiece for converting said receive signals to corresponding acoustic signals, and wherein said humbucking means is disposed adjacent said earpiece so as to generate said cancellation magnetic field in an area proximate said earpiece so that magnetic coupling between said wireless telephone and electronic apparatuses proximate said earpiece is reduced.

3. The wireless telephone of claim 1, wherein said humbucking means generates said cancellation magnetic field in antiphase with said transmission magnetic field.

4. The wireless telephone of claim 1, wherein said humbucking coil is connected to said supply path to bypass a fraction of said supply current during transmission of said transmit signals.

5. The wireless telephone of claim 4, wherein the supply path includes a transmitter path for passing transmitter current from said power supply to said transmitter means, wherein said humbucking coil is connected in said transmitter path so as to pass at least a fraction of said transmitter current, and wherein said fraction of said transmitter current passing through said humbucking coil is directly proportional to said transmitter current such that said cancellation magnetic field is directly proportional to said transmission magnetic field.

6. The wireless telephone of claim 4, wherein the humbucking coil is connected in parallel across a path length in said supply path having a selected resistance.

7. The wireless telephone of claim 6, wherein the resistance of said path length in said supply path is adjustable so as to adjust said fraction of said supply current passing through said humbucking coil.

8. The wireless telephone of claim 1, further including control circuitry and a T/R switch for intermittently connecting said transmitter and said receiver to an antenna.

9. The wireless telephone of claim 1, wherein said humbucking means includes a current drive for passing current through said humbucking coil so as to generate said cancellation magnetic field.

10. The wireless telephone of claim 9, wherein said current drive is adjustable to control the current outputted by said current drive.

11. The wireless telephone of claim 10, wherein said humbucking means includes means for adjusting said current drive so that current is outputted from said current drive in proportion to said current consumed by said transmitter means.

12. The wireless telephone of claim 10, wherein said current drive is adjustable in response to keyboard inputs from said wireless telephone.

13. A wireless telephone comprising:
   a) a power source;
   b) a radio circuit connected to said power source and having a transmit mode where transmit signals are transmitted by a transmitter and a receiver mode where receive signals are received by receive circuitry, said radio circuit intermittently switched between said transmit mode and said receive mode, and wherein said radio circuit generates a transmission magnetic field when said radio circuit is transmitting transmit signals; and
   c) a humbucking coil connected in said radio circuit for generating a cancellation magnetic field that is directly proportional to said transmission magnetic field so as to at least partially cancel said transmission magnetic field and reduce magnetic coupling between said wireless telephone and proximate electronic apparatuses.

14. The wireless telephone of claim 13, further including an earpiece for converting said receive signals to corresponding acoustic signals, and wherein said humbucking coil is disposed adjacent said earpiece so as to generate said cancellation magnetic field in an area proximate said earpiece so that magnetic coupling between said wireless telephone and electronic apparatuses proximate said earpiece is reduced.

15. The wireless telephone of claim 13, wherein said humbucking coil generates said cancellation magnetic field in antiphase with said transmission magnetic field.

16. The wireless telephone of claim 13, including a supply path for passing supply current from said power supply to said transmitter and said receiver, wherein said humbucking coil is connected to said supply path to pass at least a fraction of said supply current during transmission of transmit signals.

17. The wireless telephone of claim 13, wherein the supply path includes a transmitter path for passing transmitter current from said power supply to said transmitter, wherein said humbucking coil is connected in said transmitter path so as at least a fraction of said transmitter current, and wherein said fraction of said transmitter current passing through said humbucking coil is directly proportional to said transmitter current such that said cancellation magnetic field is directly proportional to said transmission magnetic field.

18. The wireless telephone of claim 16, wherein the humbucking coil is connected in parallel across a path length in said supply path having a selected resistance.

19. The wireless telephone of claim 18, wherein the resistance of said path length in said supply path is adjustable so as to adjust said fraction of said supply current passing through said humbucking coil.

20. The wireless telephone of claim 13, further including a current drive connecting said humbucking coil to said radio circuit, said current drive passing current through said humbucking coil so as to generate said cancellation magnetic field.

21. The wireless telephone of claim 20, wherein said current drive is adjustable to control the current outputted by said current drive.

22. The wireless telephone of claim 21, further including means for adjusting said current drive so as to output current from said current drive in proportion to said current consumed by said transmitter means.

23. The wireless telephone of claim 21, wherein said current drive is adjustable in response to keyboard inputs from said wireless telephone.

24. A wireless telephone comprising:
   a) a power source;
   b) a radio circuit for transmitting and receiving, wherein during operation of said radio circuit a first magnetic field is generated by said radio circuit; and
   c) a humbucking coil coupled to said radio circuit for passing current from said radio circuit and generating a second magnetic field directly proportional to current consumed by said radio circuit and in antiphase with said first magnetic field to at least partially cancel said first magnetic field and reduce magnetic coupling between said wireless telephone and proximate electronic apparatuses.

25. The wireless telephone of claim 24, further including a transmitter for transmitting transmit signals and connected to said power supply by a transmitter path, and wherein said humbucking coil is connected to said transmitter path to bypass current from said transmitter path and generate said second magnetic field.

26. The wireless telephone of claim 24, further including a current drive connecting said humbucking coil to said radio circuit, said current drive passing current through said humbucking coil so as to generate said cancellation magnetic field.

27. The wireless telephone of claim 26, wherein said current drive is adjustable to control the current outputted by said current drive.

28. The wireless telephone of claim 27, where the further including means for adjusting said current drive so as to output current from said current drive in proportion to said current consumed by said transmitter means.

29. The wireless telephone of claim 27, wherein said current drive is adjustable in response to keyboard inputs from said wireless telephones.

* * * * *